United States Patent [19]
Sloan

[11] Patent Number: 5,621,791
[45] Date of Patent: Apr. 15, 1997

[54] ERGONOMICALLY DESIGNED TELEPHONE HANDSET

[75] Inventor: Roderick M. Sloan, Houston, Tex.

[73] Assignee: Thomson Consumer Electronics, Inc., Indianapolis, Ind.

[21] Appl. No.: 470,973

[22] Filed: Jun. 6, 1995

Related U.S. Application Data

[63] Continuation of Ser. No. 183,961, Jan. 21, 1994, abandoned.

[51] Int. Cl.$^6$ ..................................................... H04M 1/00
[52] U.S. Cl. ............................................ 379/433; 379/434
[58] Field of Search .................................... 379/433, 434, 379/430, 447, 428; D14/248

[56] References Cited

U.S. PATENT DOCUMENTS

| | | | |
|---|---|---|---|
| D. 304,588 | 11/1989 | Desbarats | D14/248 |
| 3,231,688 | 1/1966 | Ugartechea | 379/447 |
| 4,926,474 | 5/1990 | Marks | 379/433 |
| 5,042,071 | 8/1991 | Stinauer et al. | 379/433 |

FOREIGN PATENT DOCUMENTS

| | | | |
|---|---|---|---|
| 1212389 | 11/1970 | United Kingdom | 379/433 |

*Primary Examiner*—Thomas W. Brown
*Assistant Examiner*—Jack Chiang
*Attorney, Agent, or Firm*—Woodard, Emhardt, Naughton Moriarty & McNett

[57] ABSTRACT

A telephone handset is provided, the earpiece of which is designed to couple the speaker portion to the outer ear while reducing the pressure applied across the tragus and antitragus, and to thus reduce the discomfort of the user. One preferred embodiment of the present invention includes a telephone handset, the earpiece of which includes a modified funnel shaped sound cavity located above the handset's speaker element and surrounded by a planar surface. The intersection of the sound cavity with the planar surface is defined by a pear shaped or teardrop shaped outline. The earpiece is coupled to the outer ear without undue pressure being applied across the tragus or antitragus. Rather, the tapering portion of the teardrop shaped cavity is coupled with the soft, fleshy earlobe, thus providing a good acoustical coupling between the telephone speaker element of the handset and the outer ear of the user, without allowing the planar surface to painfully cut across the tragus and antitragus of the user.

2 Claims, 6 Drawing Sheets

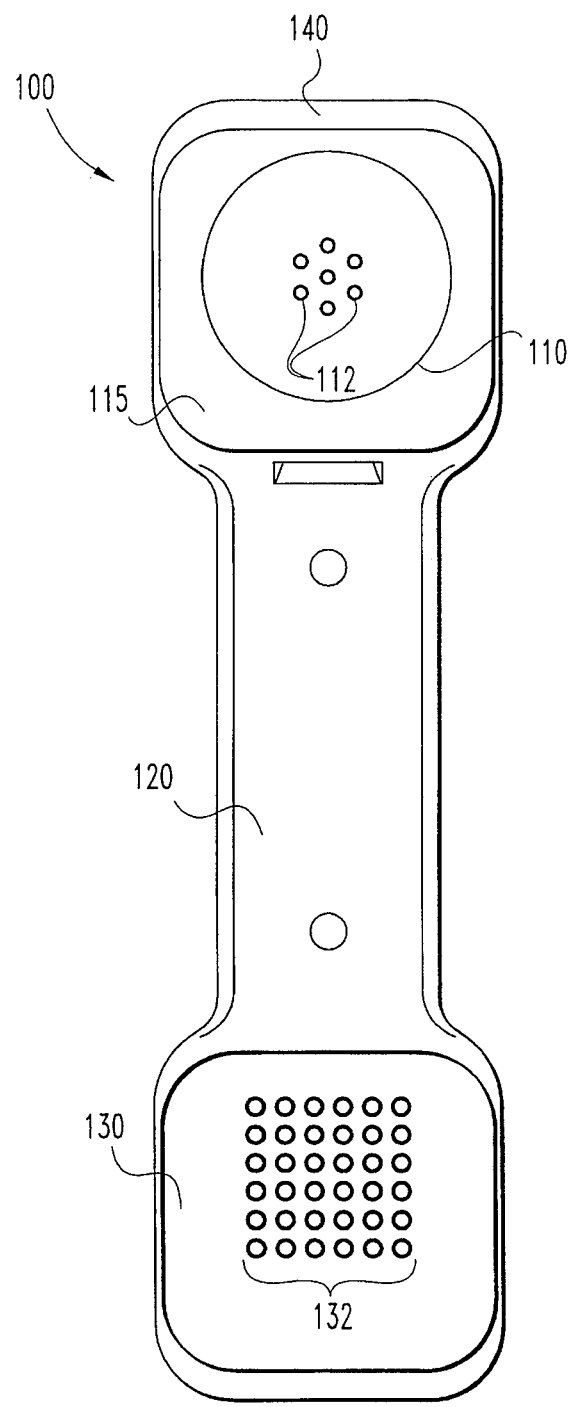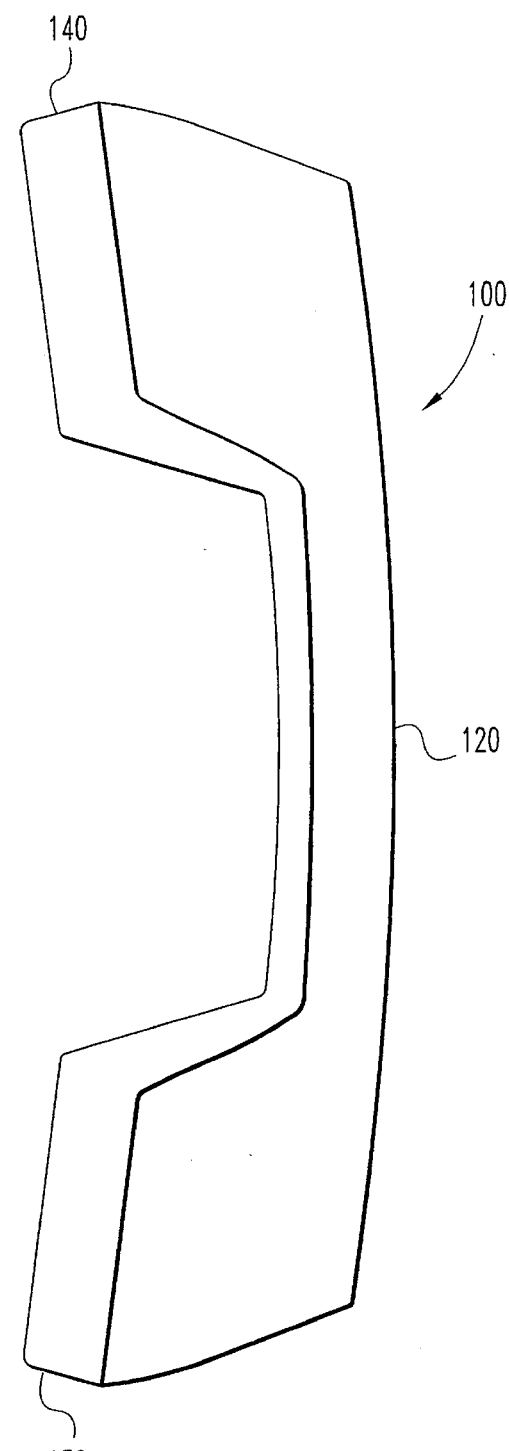
Fig. 2A
(PRIOR ART)
Fig. 2B
(PRIOR ART)

5,621,791

ERGONOMICALLY DESIGNED TELEPHONE HANDSET

This application is a continuation of application Ser. No. 08/183,961, filed Jan. 21, 1994, now abandoned.

BACKGROUND OF THE INVENTION

The present invention relates generally to the field of telephone handsets for use with telephone receiver devices and more particularly, to a specially designed telephone handset including an ergonomically designed earpiece for reducing the pressure applied to the outer ear during telephone use and for increasing the comfort of the user.

Traditionally, telephone handset earpiece's have included a circularly defined, funnel-shaped sound cavity which is molded into the handset material centered above the earpiece speaker unit of a telephone handset. Telephone handsets have evolved to include a standard "K" type handset, as shown in FIGS. 2A and 2B. The prior art type telephone handset shown in FIGS. 2A and 2B includes the standard molded circularly defined sound cavity 110 included in the earpiece portion 140 of the handset 100. One problem with the design of prior art telephone handsets is that, when used to coupled the sound cavity of the handset to the outer ear, pressure is applied across the bottom, cartilaginous emininces of the outer ear, which may cause discomfort to the user.

As such, there is a need for a telephone handset including an earpiece that has been designed to reduce the pressure applied across the outer ear during telephone use, resulting in improved comfort to the user.

SUMMARY OF THE INVENTION

One object of the present invention is to provide a telephone handset which includes a mouthpiece portion, a handgrip for permitting a user to grip the telephone handset, and a speaker portion for permitting acoustical coupling between the telephone handset and the outer ear of a user, wherein the speaker portion includes a planar surface and a sound cavity and an acoustical seal is formed between the speaker portion and the outer ear of the telephone user without permitting the planar surface to cut across the tragus and antitragus of the outer ear of the user.

Another object is to provide an improved telephone handset.

Related objects and advantages of the present invention will be apparent from the following description.

BRIEF DESCRIPTION OF THE DRAWINGS

FIG. 2A is a front elevational view of a prior art telephone handset.

FIG. 2B is a side elevational view of a telephone handset.

DESCRIPTION OF THE PREFERRED EMBODIMENT

Figure 1:
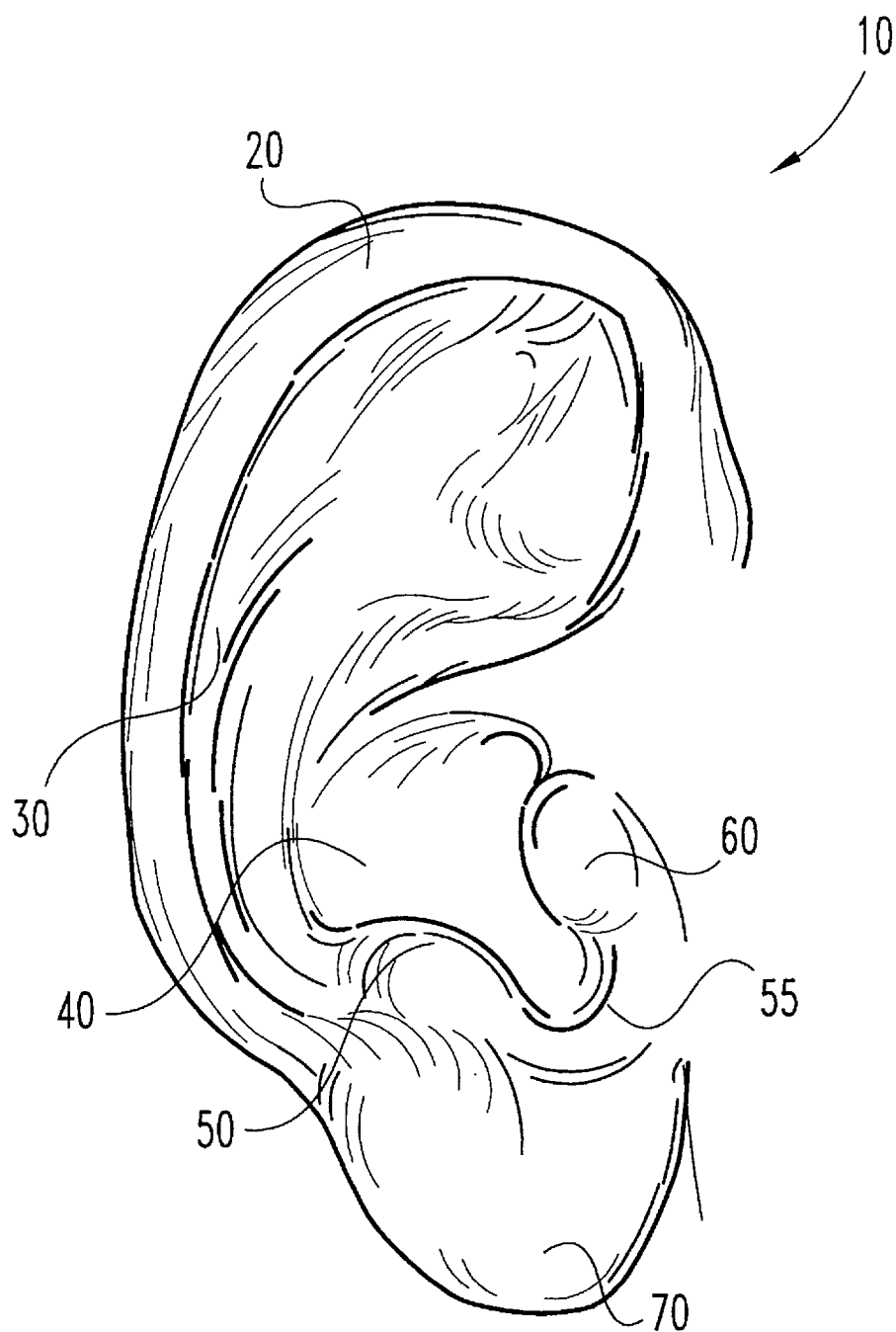
FIG. 1 is a perspective view of the outer ear, useful for explaining the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown a perspective view of an external auricle or pinna, commonly known as the outer ear 10. The outer ear 10 serves to collect vibrations in the air in which sound is produced and transfers those vibrations, via the auditory meatus (not shown) to the middle and inner ear. The pinna includes a helix portion 20, an anti-helix portion 30, a cavum concha portion 40, and a fleshy lobe portion 70. Additionally, and more importantly for the present invention, the pinna 10 includes a tragus 60 and an antitragus 50, which are separated by a recess 55. The tragus 60 and antitragus 50 are cartilaginous eminences which project over the cavum concha. Furthermore, the tragus 60 is disposed over the auditory meatus.

When a telephone handset is held up to the ear, the earpiece portion is usually held in contact with the pinna or outer ear 10 in order to couple the sound cavity, which is located over the speaker element in the handset, to the outer ear 10. Thus, vibrations from the microphone element are picked up by the outer ear 10 and transferred to the auditory meatus, which is located below and protected by the tragus 60. FIGS. 2A and 2B show a telephone handset 100 of a type known in the prior art.

Referring now to the prior art device shown in FIGS. 2A and 2B, the handset design shown is known as the standard "K" handset configuration. Handset 100 includes an earpiece or speaker portion 140, a hand grip portion 120 and a mouthpiece or microphone portion 130. The speaker portion 140 includes a planar surface 115 including a circularly defined, funnel-shaped sound cavity 110 centered therein. The circularly defined sound cavity 110 is typically molded into the handset and surrounds the earpiece's internal speaker element so as to provide an external sound cavity for the speaker. A plurality of sound holes 112 and 132 are molded into the earpiece portion above the speaker element and in the mouthpiece portion above the microphone element. These sound holes 112 and 132 allow sound to travel to and from the speaker and microphone elements, through the handset material.

When telephone handset 100 is in use, the handset 100 is gripped at hand grip portion 120 and held such that the mouthpiece portion 130 is adjacent the user's mouth and the earpiece portion 140 is cupped firmly against the user's outer ear (10 of FIG. 1), so that the outer ear creates an acoustical seal around the sound cavity 110. This acoustical seal or coupling promotes the transmission of sound from the speaker element to the ear. Portions of the planar surface 115 typically contact the anti-helix portion (30 of FIG. 1) of the user's outer ear. Further, due to the circular outline of the sound cavity, the planar surface 115 contacts the bottom portion of the pinna, cutting across the tragus and the antitragus, thus applying pressure to those parts. As a result, the tragus and antitragus are typically forced towards each other and also in towards the cavum concha portion of the outer ear, and are held in this unnatural position for the duration of the telephone conversation.

Figure 3A:
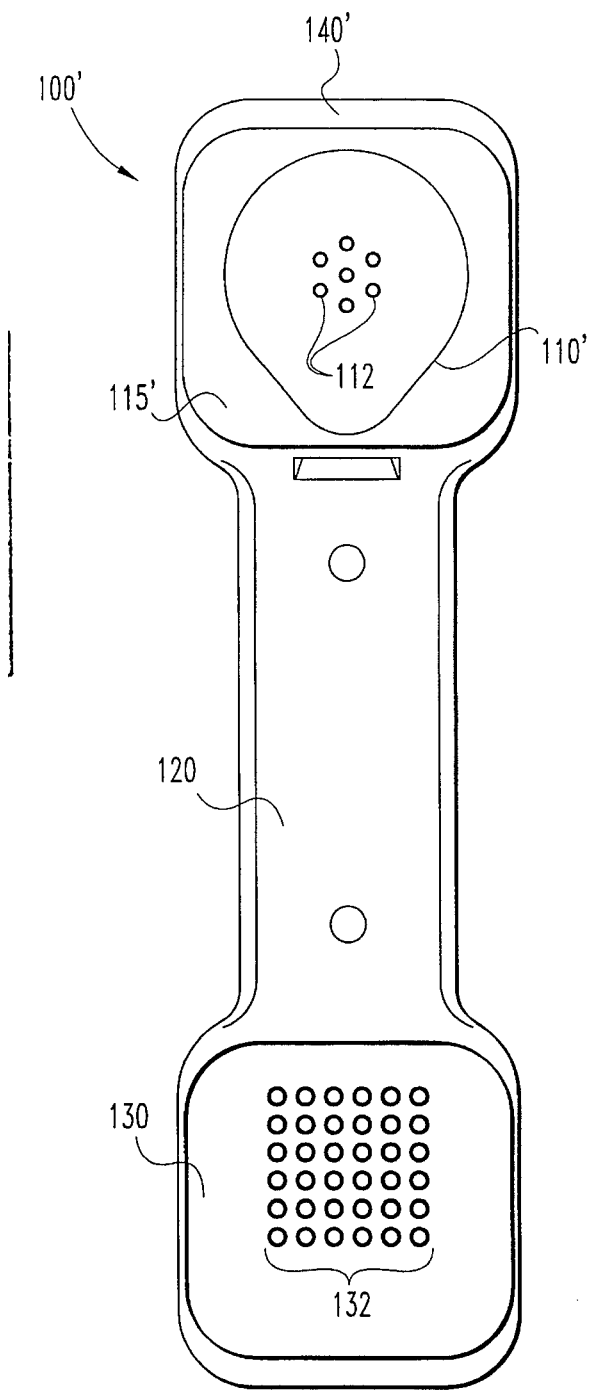
FIG. 3A is a front elevational view of one embodiment of an ergonomically designed telephone receiver's handset in accordance with the principles of the present invention.
Figure 3B:
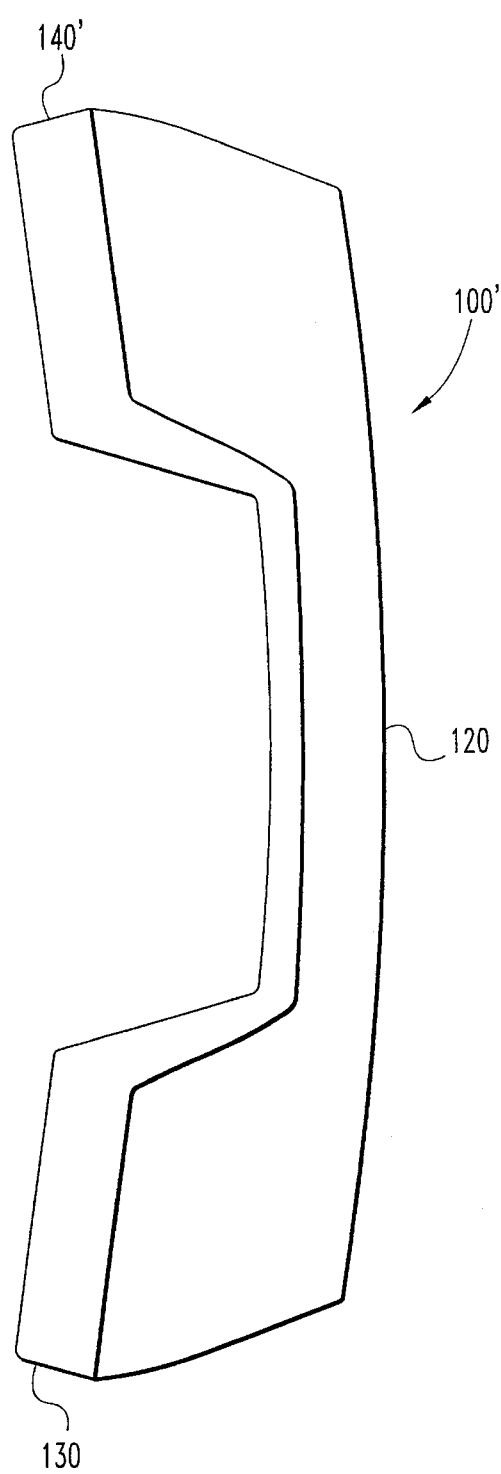
FIG. 3B is a side elevational view of the telephone receiver's handset of FIG. 3A.

Referring now to FIGS. 3A and 3B, there is shown a telephone handset 100' in accordance with one embodiment of the present invention. The telephone handset 100' of the preferred embodiment of the present invention has been designed to overcome the above described disadvantage of the prior art by reducing the amount of pressure applied across the tragus and antitragus while maintaining an optimal coupling between the outer ear and the telephone handset 100'. Like the telephone handset 100 of FIG. 2A, telephone handset 100' of FIG. 3A includes a mouthpiece or speaker portion 130 and a hand grip portion 120. Likewise, sound holes 112 and 132 are molded into the earpiece and mouthpiece portions, respectively, to permit sound to pass through the material of the handset. However, unlike the handset 100 of FIG. 2A, the earpiece portion 140' of telephone handset 100' has been molded to include a non-hemispherically shaped sound cavity 110' which intersects the planar surface 115' to define an inverted pear shaped or inverted teardrop shaped outline, hereinafter referred to as the teardrop shaped cavity, which is surrounded by a planar surface 115'. By inverted pear shaped or inverted teardrop shaped it is meant that the outline is bulbous towards the top and more tapered or narrowed towards the bottom. Teardrop shaped does not, necessarily, mean that the tapered portion terminates at a point, although it can be chosen to do so. Thus, when the earpiece portion 140' of the handset 100' is held to the outer ear, the tapering portion of the teardrop shaped cavity contacts at least a portion of the fleshy lobe portion of the outer ear, without cutting across it or the tragus and antitragus, thus preventing pressure from being applied across the tragus and antitragus. Thus an acoustical seal may be formed between the sound cavity 110' and the outer ear without cutting across the tragus and antitragus. Rather the teardrop shaped cavity 110' allows the lower portion of the speaker portion of the handset to couple comfortably with the lobe of the pinna (70 of FIG. 1) which is located below the tragus and antitragus, resulting in the lobe being at least partially seated in the tapering portion of the teardrop shaped cavity. Thus the handset 100' can be coupled with the outer ear to promote the transmission of sound from the speaker to the outer ear without causing discomfort to the user.

FIG. 3B shows a side view of the telephone receiver which, in the present embodiment, is identical to that shown in FIG. 2B. Although, a standard "K" type handset is illustrated, the use of such a handset is only illustrative, it is not meant to limit the use of the present invention only to a "K" type handset. Rather, the present invention is suitable for use with other types of telephone handset designs, including those incorporating the telephone keypad into the handset.

Figure 4A:
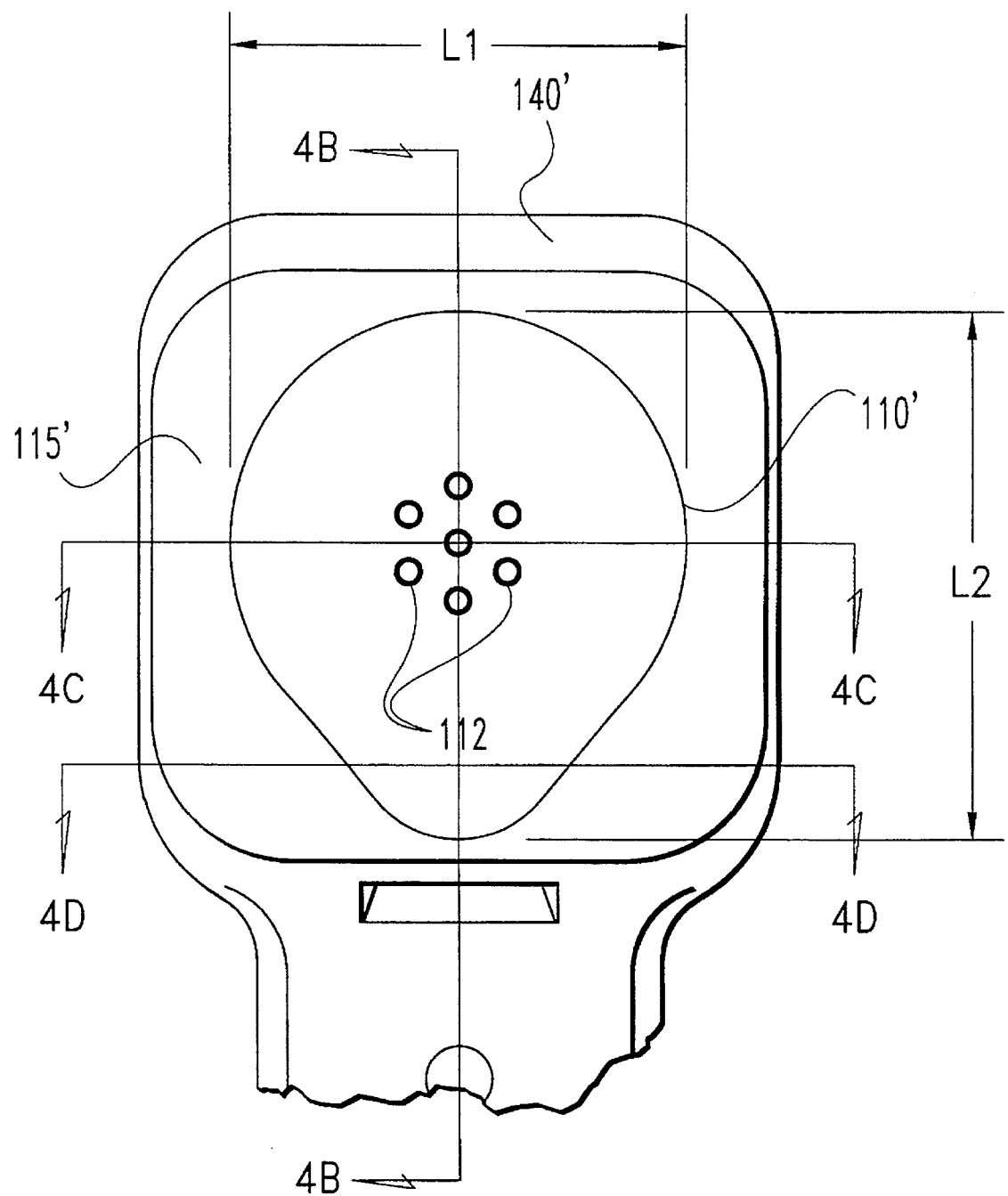
FIG. 4A is a partial enlarged front elevational view of the telephone handset of FIGS. 3A and 3B showing the earpiece portion of the handset in accordance with the present invention.

Referring now to FIG. 4A, there is shown a partial and enlarged view of the handset 100'. More particularly, FIG. 4A shows an enlarged view of the earpiece portion 140' of the telephone handset 100'. The teardrop shaped cavity 110' is shown having lengths L1 and L2. Lengths L1 and L2 should be chosen to optimize the comfort level of the user. This may be done in commercial environments by selecting average lengths which allow the cavity 110' to be cupped to the ear without cutting across and applying pressure to the tragus and antitragus. Further, it is contemplated that these lengths could be tailored to particular users. In the preferred embodiment of the invention, the length portion L1 is about 40.8 mm across the widest portion of the teardrop shaped cavity 110'. Additionally, in the preferred embodiment, the length portion L2 is chosen to be about 43.41 mm from top to bottom of the teardrop shaped cavity 110'.

Figure 4B:
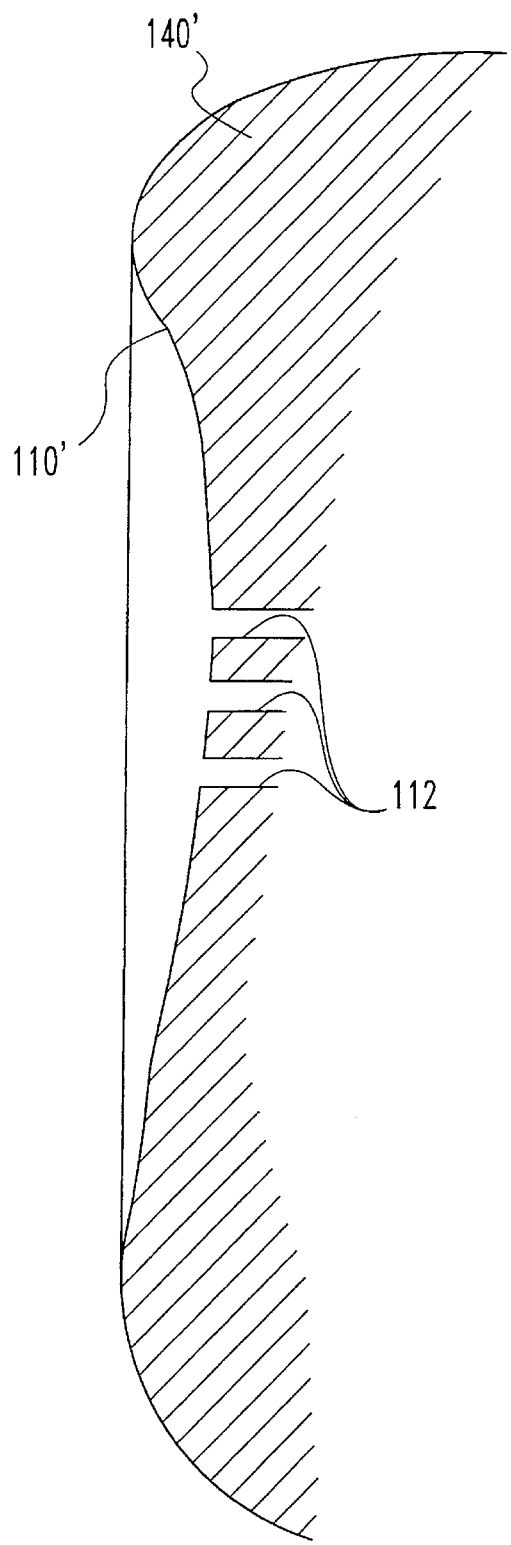
FIG. 4B is a partial side elevational view in full section of the telephone handset of FIG. 4A taken along line 4B—4B.
Figure 4C:
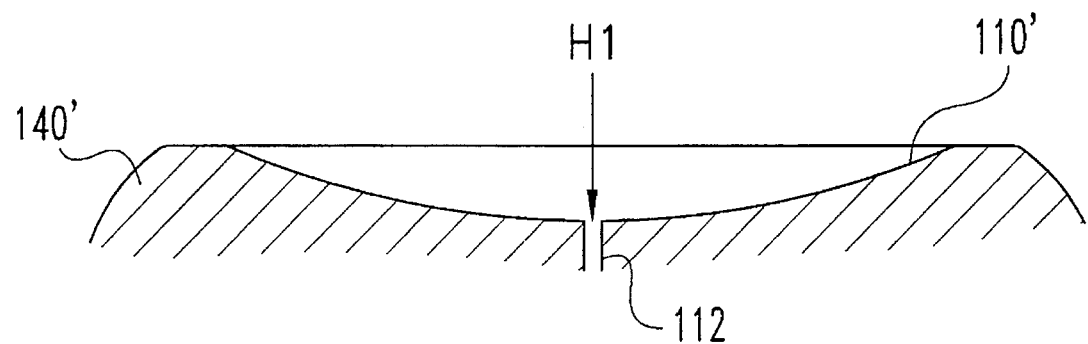
FIG. 4C is a partial side elevational view in full section of the telephone handset of FIG. 4A taken along line 4C—4C.

FIG. 4B is a partial side elevational view in full section of the telephone handset of FIG. 4A taken along line 4B—4B, which extends through the length of the teardrop shaped cavity. As is shown in the figures, the depth of the teardrop shaped cavity 110' is greatest right over the internal speaker element, which is located in the bulbous portion of the sound cavity. The teardrop shaped cavity becomes more shallow towards the tapering portion of the teardrop, which permits the ear lobe (70 in FIG. 1) to be seated in the shallow end of the cavity 110', thus providing for good acoustic coupling between the outer ear of the user and the sound cavity of the handset. Additionally, by coupling the handset with the outer ear in this manner the application of pressure directly across the tragus and antitragus is avoided. The changing depth of the sound cavity 110' is further emphasized in FIGS. 4C and 4D wherein the height H1 of FIG. 4C is of a greater than that of height H2 shown in FIG. 4D. In the preferred embodiment, the height H1 is about 4.63 mm.

Figure 4D:
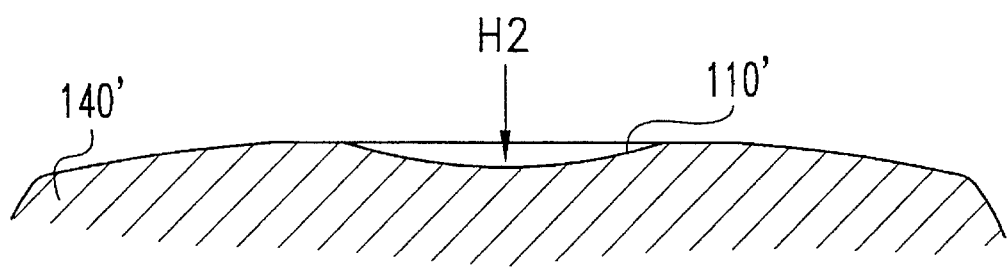
FIG. 4D is a partial side elevational view in full section of the telephone handset of FIG. 4A taken along line 4D—4D.

As shown in FIGS. 4B–4D, the sound cavity 110' may also be tapered such that starting from the edges, the walls of the cavity slope towards a central point above the speaker element, that point being shown in FIG. 4C at height H1. As such, the sound cavity additionally is of a modified "cup" or "funnel" shaped design. The use of a funnel or cup shape is designed to promote the transmission of sound from the speaker element throughout the sound cavity 110' and to the speaker element located below the sound holes 112. The handset of the present invention may be made of a hard plastic material, such as is known in the telephone art. Additionally, the sound cavity may be molded therein during formation of the handset.

While the invention has been illustrated and described in detail in the drawings and foregoing description, the same is to be considered as illustrative and not restrictive in character. Other shapes of sound cavity, which are not circularly defined are intended to be within the scope and spirit of the present invention. For example, a sound cavity defined by an elliptical outline intersecting the planar surface of the handset would also work, though the acoustic coupling would be less optimal than that of the preferred pear or teardrop shaped cavity illustrated herein. The point being that the sound cavity is coupled to the outer ear without the planar surface of the speaker portion of the handset cutting across the tragus and antitragus. Rather, a shallower portion of the sound cavity contacts the fleshy lobe to cause the outer ear to create an acoustical seal around the handset's speaker element without causing discomfort to the user. As such, it is to be understood that only the preferred embodiment has been shown and described and that all changes and modifications that come within the spirit of the invention are desired to be protected.

I claim:

1. A method for comfortably coupling an ergonomically designed telephone handset to the outer ear of a user without causing discomfort to the tragus and antitragus of the ear, comprising the steps of:

providing a telephone handset comprising:

a mouthpiece portion including an internal microphone;

a speaker portion including an internal speaker and at least one planar surface;

a sound cavity molded into said speaker portion, a cross-sectional outline of said sound cavity being defined at the intersection of said planar surface and said sound cavity as having an inverted tear-drop shaped outline, said sound cavity being disposed above said internal speaker for focusing sound from said internal speaker into the outer ear, wherein said sound cavity includes a maximum width dimension and a maximum length dimension;

an elongate grip portion including first and second ends, said first end attached to said mouthpiece portion, said second end attached to said speaker portion, a grip axis being defined through the length of said elongate grip portion;

wherein a length axis is defined through the maximum length dimension of said sound cavity, said length axis being parallel to said grip axis, and wherein a width axis is defined through said maximum width dimension of said sound cavity, said width axis being perpendicular to said length axis, wherein said maximum length dimension of said sound cavity is greater than said maximum width dimension of said sound cavity, said inverted tear-drop shaped outline having a semicircular outline above said width axis, directed away from said mouthpiece portion and a tapered outline portion below said width axis, said tapered outline portion tapering towards said mouthpiece portion, wherein the depth of said sound cavity relative to a plane through said planar surface of said speaker portion is greatest over said internal speaker comparing to the depth of a top portion of the semicircular outline and the depth of the tear-drop shaped cavity, the depth of said tear-drop shaped cavity is more shallow in said tapering outline portion of said sound cavity comparing to the depth of the semicircular outline, said depth of said shallow portion being sufficient to seat at least a portion of the fleshy lobe of the ear of the user in said shallow portion during normal use of the telephone handset;

coupling said handset to the outer ear, and positioning said handset against said outer ear such that said teardrop shaped sound cavity substantially encompasses the tragus and anti-tragus of the user's outer ear and such that at least a portion of the fleshy lobe of the outer ear is seated in and supported by said shallow portion of said sound cavity, whereby the application of pressure directly across the tragus and antitragus of the ear by said planar surface of said speaker portion is avoided.

2. An ergonomically designed telephone handset for coupling with the outer ear of a user without causing discomfort to the tragus and antitragus of the ear, comprising:

a mouthpiece portion including an internal microphone;

a speaker portion including an internal speaker and at least one planar surface;

a sound cavity molded into said speaker portion, a cross-sectional outline of said sound cavity being defined at the intersection of said planar surface and said sound cavity as having an inverted tear-drop shaped outline, said sound cavity being disposed above said internal speaker for focusing sound from said internal speaker into the outer ear, wherein said sound cavity includes a maximum width dimension and a maximum length dimension;

an elongate grip portion including first and second ends, said first end attached to said mouthpiece portion, said second end attached to said speaker portion, a grip axis being defined through the length of said elongate grip portion;

wherein a length axis is defined through the maximum length dimension of said sound cavity, said length axis being parallel to said grip axis, and wherein a width axis is defined through said maximum width dimension of said sound cavity, said width axis being perpendicular to said length axis, wherein said maximum length dimension of said sound cavity is greater than said maximum width dimension of said sound cavity, said inverted tear-drop shaped outline having a semicircular outline above said width axis, directed away from said mouthpiece portion and a tapered outline portion below said width axis, said tapered outline portion tapering towards said mouthpiece portion, wherein the depth of said sound cavity relative to a plane through said planar surface of said speaker portion is greatest over said internal speaker comparing to the depth of a top portion of the semicircular outline and the depth of the tear-drop shaped cavity, the depth of said tear-drop shaped cavity is more shallow in said tapering outline portion of said sound cavity comparing to the depth of the semicircular outline, said depth of said shallow portion being sufficient to seat at least a portion of the fleshy lobe of the ear of the user in said shallow portion during normal use of the telephone handset;

wherein when said handset is coupled to the outer ear, at least a portion of the fleshy lobe of the outer ear is seated in and supported by said shallow portion of said sound cavity and said teardrop shaped sound cavity substantially encompasses the tragus and anti-tragus of the user's outer ear, whereby seating the ear lobe in said shallow portion forms an acoustical seal between said sound cavity and said outer ear without said planar surface of said speaker portion applying pressure directly across the tragus and antitragus of the ear.

* * * * *